(12) United States Patent
Clark et al.

(10) Patent No.: US 7,085,849 B1
(45) Date of Patent: Aug. 1, 2006

(54) SCHEDULER SYSTEMS AND METHODS FOR TRANSMIT SYSTEM INTERFACES

(75) Inventors: Kevin Clark, Santa Cruz, CA (US); Sharada Yeluri, San Jose, CA (US); Shahriar Ilislamloo, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 861 days.

(21) Appl. No.: 10/092,509

(22) Filed: Mar. 8, 2002

(51) Int. Cl.
*G06F 15/173* (2006.01)
*G06F 13/28* (2006.01)
*H04L 12/00* (2006.01)

(52) U.S. Cl. .................. 709/234; 710/308; 710/35; 370/235

(58) Field of Classification Search .......... 709/234; 710/36, 52, 56
See application file for complete search history.

(56) References Cited

U.S. PATENT DOCUMENTS 6,668,297 B1 * 12/2003 Karr et al. .............. 710/305
6,795,870 B1 * 9/2004 Bass et al. ................ 710/6
6,799,229 B1 * 9/2004 Lin ....................... 710/52
6,891,845 B1 * 5/2005 Boock et al. ............ 370/412
6,907,002 B1 * 6/2005 Beshai et al. ........... 370/230
2002/0136230 A1 * 9/2002 Dell et al. ............... 370/416

OTHER PUBLICATIONS

Doshi et al. A Simple Data Link (SDL) Protocol for Next Generation Packet Network, pp. 1825-1837, IEEE Oct. 2000.*
Co-pending U.S. Appl. No. 10/197,484, filed Jul. 18, 2002, entiitled "Merge Systems and Methods for Transmit System Interfaces," Sharada Yeluri et al.
US 6,084,249, 10/2004, Bass et al. (withdrawn)*

* cited by examiner

*Primary Examiner*—Larry D. Donaghue
(74) *Attorney, Agent, or Firm*—Harrity Snyder, LLP (57) ABSTRACT

A system balances bandwidth used by a data stream. The system receives data in the data stream and partitions the data into bursts. The system then identifies whether a size of a current one of the bursts is less than a size of a maximum burst associated with the data stream and schedules an additional burst in the data stream when the current burst size is less than the maximum burst size. The system transmits the current burst and the additional burst to balance bandwidth used by the data stream.

31 Claims, 12 Drawing Sheets

SCHEDULER SYSTEMS AND METHODS FOR TRANSMIT SYSTEM INTERFACES

BACKGROUND OF THE INVENTION

1. Field of the Invention

The present invention relates generally to data transfer and, more particularly, to systems and methods for balancing traffic bandwidth.

2. Description of Related Art

Systems often use high speed interfaces to transfer data. One example of a high speed interface is PL4. PL4, short for "POS-PHY L4," is an interface specification developed by an industry consortium. PL4 is designed to transfer data between a physical layer (PHY) device and a link layer device at aggregate bandwidths of OC-192 Asynchronous Transfer Mode (ATM) and Packet over SONET/SOH (POS), as well as 10 gigabit per second Ethernet. System Packet Interface Level 4 (SPI4) is another example of an industry bus substantially similar to PL4.

More particularly, PL4 is a burst-oriented interface that receives 2 bytes of control signal(s) and a fixed maximum amount of data (e.g., 64 bytes, 128 bytes, 32 bytes, etc.). The PL4 interface may be considered a maximum transfer size-based interface because for each transfer by a PL4 interface, the PL4 interface outputs data of some maximum transfer (burst) size. The PL4 interface uses a protocol that requires all data bursts, except for end-of-packet bursts, to be multiples of 16 bytes.

The PL4 interface is not a fixed time slot interface, resulting in efficient use of system bandwidth. For example, congested streams can use unused bandwidth of other idle streams.

Figure 1:
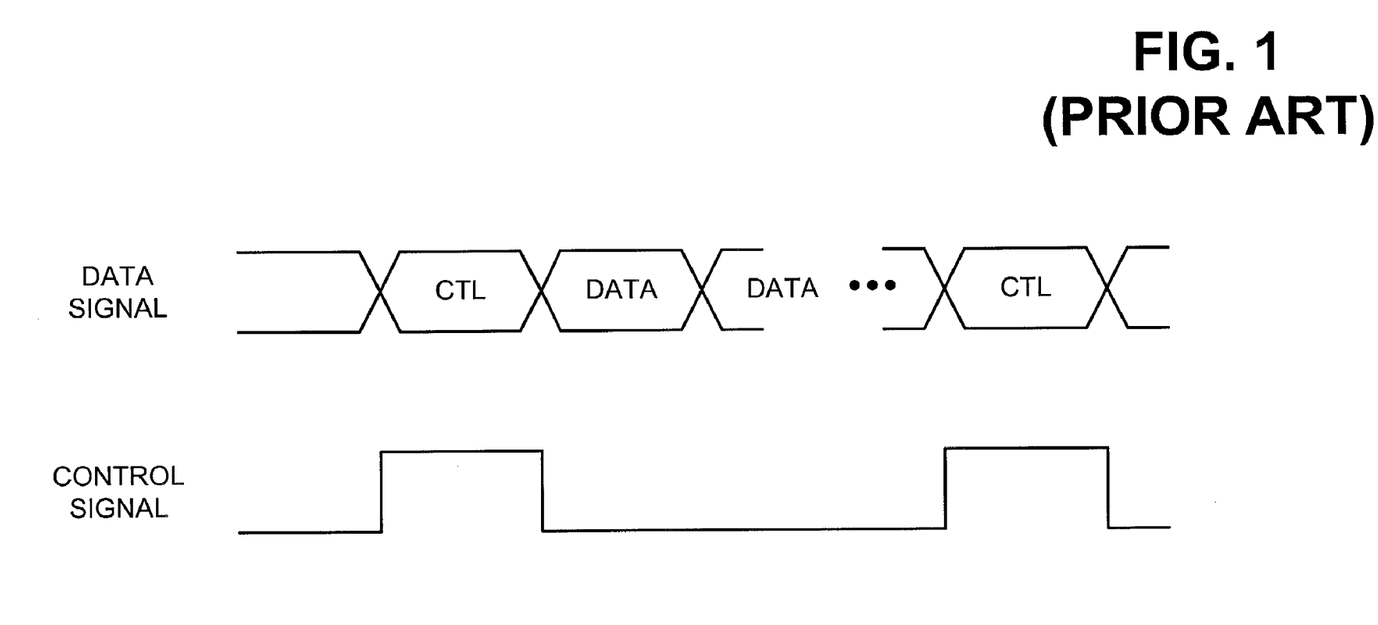
FIG. 1 is a data flow diagram of a transfer by a conventional PL4 interface.

FIG. 1 is a data flow diagram of a transfer by a conventional PL4 interface. The data transfer includes a data signal and a control signal. The data signal may include a control frame or one or more data frames. If a packet includes more than 64 bytes of data (e.g., 512 bytes), the PL4 interface sends the data in bursts (e.g., 64 byte bursts) within the data frames. The control signal identifies whether the data signal includes a control frame or a data frame.

A control frame contains start of packet (SOP), end of packet (EOP), start of burst (SOB), and end of burst (EOB) information. EOP/SOP, EOB/SOB, and EOP/idle can occur in the same control frame.

The control frame may also include a stream number that identifies the stream to which the data signal and control signal correspond. For a single stream routing system, the stream number is zero. In this case, the single stream is allocated the full bandwidth.

In a multi-stream routing system, the PL4 interface typically processes one burst per stream and then repeats. Ideally, each of the streams makes full use of its allocated bandwidth. Situations arise, however, where one or more streams use less than their allocated bandwidth. The worst case is the scenario where one stream contains an odd packet size (e.g., 65 bytes) while the rest of the streams contain multiples of the maximum burst size (e.g., 64 bytes). In this scenario, the odd-packet-size stream could lose some of its allocated bandwidth.

Figure 2:
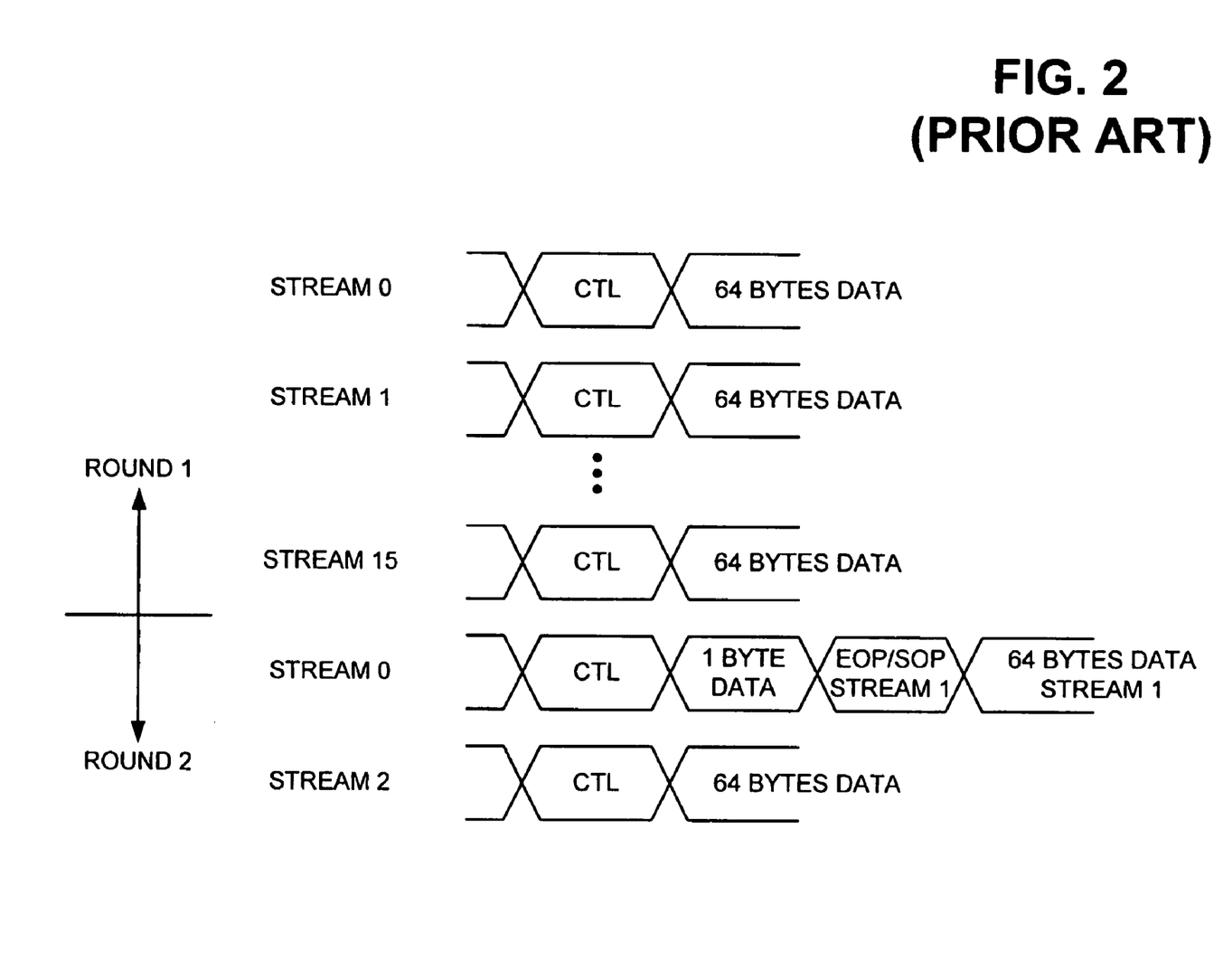
FIG. 2 is a diagram of an example data flow that illustrates a scenario in which one stream loses some of its allocated bandwidth.

FIG. 2 is a diagram of an example data flow that illustrates a scenario in which one stream loses some of its allocated bandwidth. For this example, assume that the system includes a PL4 interface that receives 16 streams and has a maximum burst size of 64 bytes. Assume further that stream 0 includes 65-byte packets and streams 1–15 include 64-byte packets.

Suppose that the PL4 interface includes a simple round robin scheduler that schedules one burst for transmission for each of the streams and then repeats. During the first round of transmissions, the PL4 interface transmits 64 bytes of packet data for each of streams 0–15. During the next round, stream 0 has one byte left of the 65 bytes of packet data. In this case, the PL4 interface transmits a single byte of packet data for stream 0 followed by an EOP/SOP stream 1 control signal and 64 bytes of packet data for stream 1. As a result, stream 0 loses much of its allocated bandwidth (approximately 50%) because of the EOP burst. Stream 0 may simply lose its fair share of bandwidth in this case.

Table 1 further illustrates this problem for cases where stream 0 contains differing packet sizes.

TABLE 1

| Packet Size for Stream 0 (Bytes) | Utilized Bandwidth (Mbs) for PL4 bus at 700 MHz - design goal: 622 Mbs | Utilization (%) for PL4 bus at 700 MHz |
|---|---|---|
| 16 | 177.8 | 25.4 |
| 17 | 188.5 | 26.9 |
| 19 | 210.3 | 30.0 |
| 33 | 360.2 | 51.5 |
| 63 | 668.2 | 95.5 |
| 65 | 355.1 | 50.73 |
| 91 | 490.9 | 68.1 |
| 129 | 465.16 | 70.3 |
| 257 | 551.6 | 78.8 |
| 513 | 608.5 | 78.8 |

In the example above where stream 0 includes 65-byte packets, stream 0's EOP 1-byte burst creates a tremendous performance hit. As shown from Table 1, stream 0 loses approximately 50% of its allocated bandwidth.

This problem is particularly troublesome on the egress path of the routing system (i.e., the path leading from the routing system to the vendor, or outside, system; as opposed to the ingress path leading from the vendor/outside system to the routing system). The ingress path has high bandwidth buses into the system with a lot of buffering and, thus, underrun is not an issue. The egress path, however, does not allow underruns or any gaps in the middle of a packet to be sent outside of the system.

Therefore, there is a need for an interface for PL4 or similar buses that optimizes use of stream bandwidth without shutting off traffic in the middle of a packet.

SUMMARY OF THE INVENTION

Systems and methods consistent with the principles of the invention address this and other needs by providing an interface for a PL4 or a similar type of bus that balances the bandwidth used by streams without interrupting packet transmission in the middle of a packet. The PL4 interface accomplishes this, at least in part, by issuing additional bursts in a stream when the current burst (e.g., at an EOP) is less than the maximum burst size for the stream.

One aspect consistent with the principles of the invention includes a system that balances bandwidth used by a data stream. The system receives data in the data stream and partitions the data into bursts. The system then identifies whether a size of a current one of the bursts is less than a size of a maximum burst associated with the data stream and schedules an additional burst in the data stream when the current burst size is less than the maximum burst size. The system transmits the current burst and the additional burst to balance bandwidth used by the data stream.

Another aspect consistent with the principles of the invention includes an interface. The interface includes a data path, a scheduler, and a transmitter. The data path is configured to receive packet data in a stream and temporarily store the packet data. The scheduler is configured to partition the packet data into bursts, determine whether a size of a current one of the bursts is less than a size of a maximum burst associated with the stream, and schedule one or more additional bursts in the stream when the current burst size is less than the maximum burst size. The transmitter logic is configured to transmit the current burst and the one or more additional bursts.

A further aspect consistent with the principles of the invention includes a network device. The network device may include a switch fabric. The network device is configured to receive data in multiple data streams, partition the data into bursts, determine whether a size of a current one of the bursts associated with one of the data streams is less than a size of a maximum burst associated with the one data stream, schedule an additional burst in the one data stream when the current burst size is less than the maximum burst size, and transmit the current burst and the additional burst in the one data stream.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with principles of the invention provide a PL4 interface, or an interface for a bus similar to PL4, that balances the bandwidth used by packet streams without interrupting packet transmission in the middle of a packet. The PL4 interface accomplishes this, at least in part, by issuing additional bursts in a stream when the current burst (e.g., at an EOP) in the stream is less than the maximum burst size for the stream.

System Configuration

Figure 3:
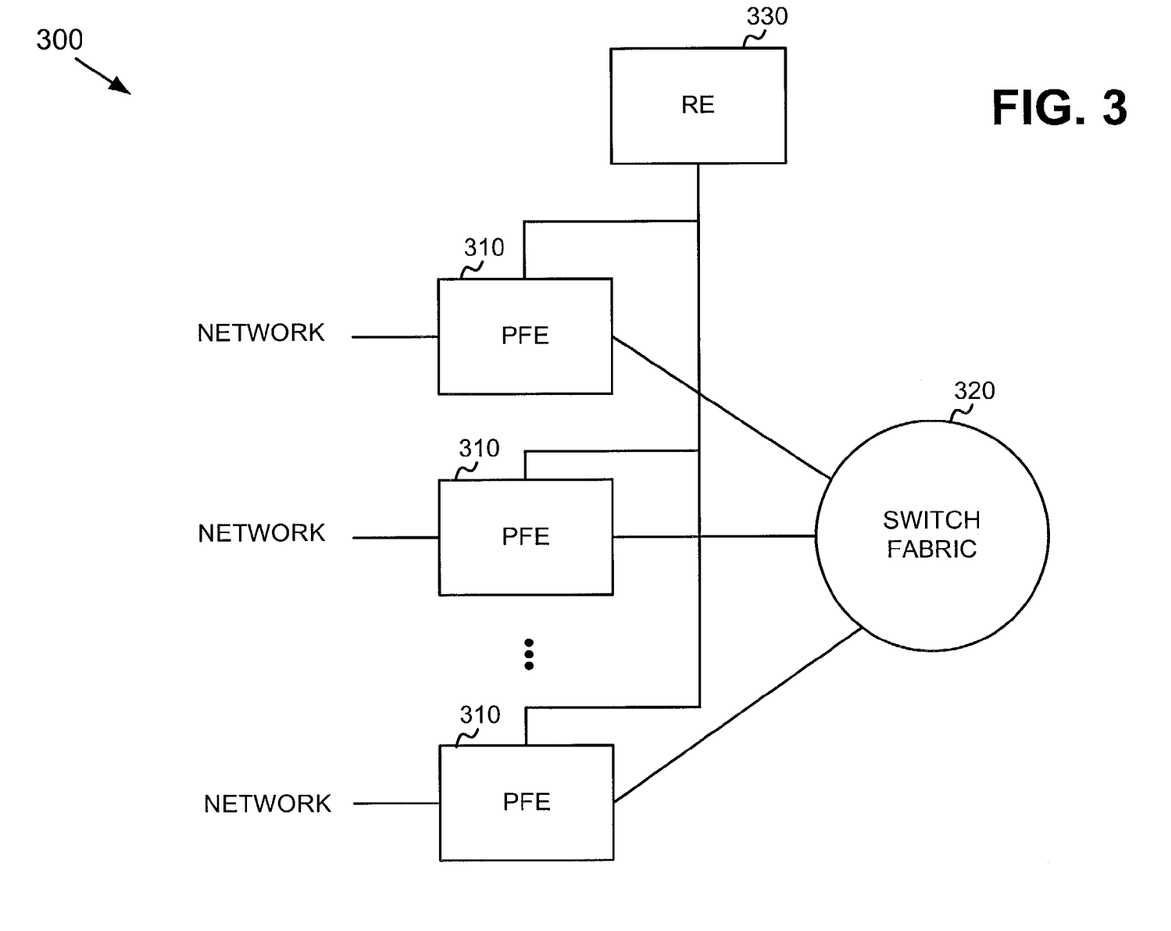
FIG. 3 is a block diagram illustrating an exemplary routing system in which systems and methods consistent with principles of the invention may be implemented.

FIG. 3 is a block diagram illustrating an exemplary routing system 300 in which systems and methods consistent with the principles of the invention may be implemented. System 300 receives one or more packet streams from a physical link, processes the packet stream(s) to determine destination information, and transmits the packet stream(s) out on a link in accordance with the destination information. System 300 may include packet forwarding engines (PFEs) 310, a switch fabric 320, and a routing engine (RE) 330.

RE 330 performs high level management functions for system 300. For example, RE 330 communicates with other networks and systems connected to system 300 to exchange information regarding network topology. RE 330 creates routing tables based on network topology information, creates forwarding tables based on the routing tables, and forwards the forwarding tables to PFEs 310. PFEs 310 use the forwarding tables to perform route lookup for incoming packets. RE 330 also performs other general control and monitoring functions for system 300.

PFEs 310 are each connected to RE 330 and switch fabric 320. PFEs 310 receive packet data on physical links connected to a network, such as a wide area network (WAN) or a local area network (LAN). Each physical link could be one of many types of transport media, such as optical fiber or Ethernet cable. The data on the physical link is formatted according to one of several protocols, such as the synchronous optical network (SONET) standard, an asynchronous transfer mode (ATM) technology, or Ethernet.

A PFE 310 may process incoming packet data prior to transmitting the data to another PFE or the network. PFE 310 may also perform a route lookup for the data using the forwarding table from RE 330 to determine destination information. If the destination indicates that the data should be sent out on a physical link connected to PFE 310, then PFE 310 prepares the data for transmission by, for example, adding any necessary headers, and transmits the data from the port associated with the physical link. If the destination indicates that the data should be sent to another PFE via switch fabric 320, then PFE 310 prepares the data for transmission to the other PFE, if necessary, and sends the data to the other PFE via switch fabric 320.

Figure 4:
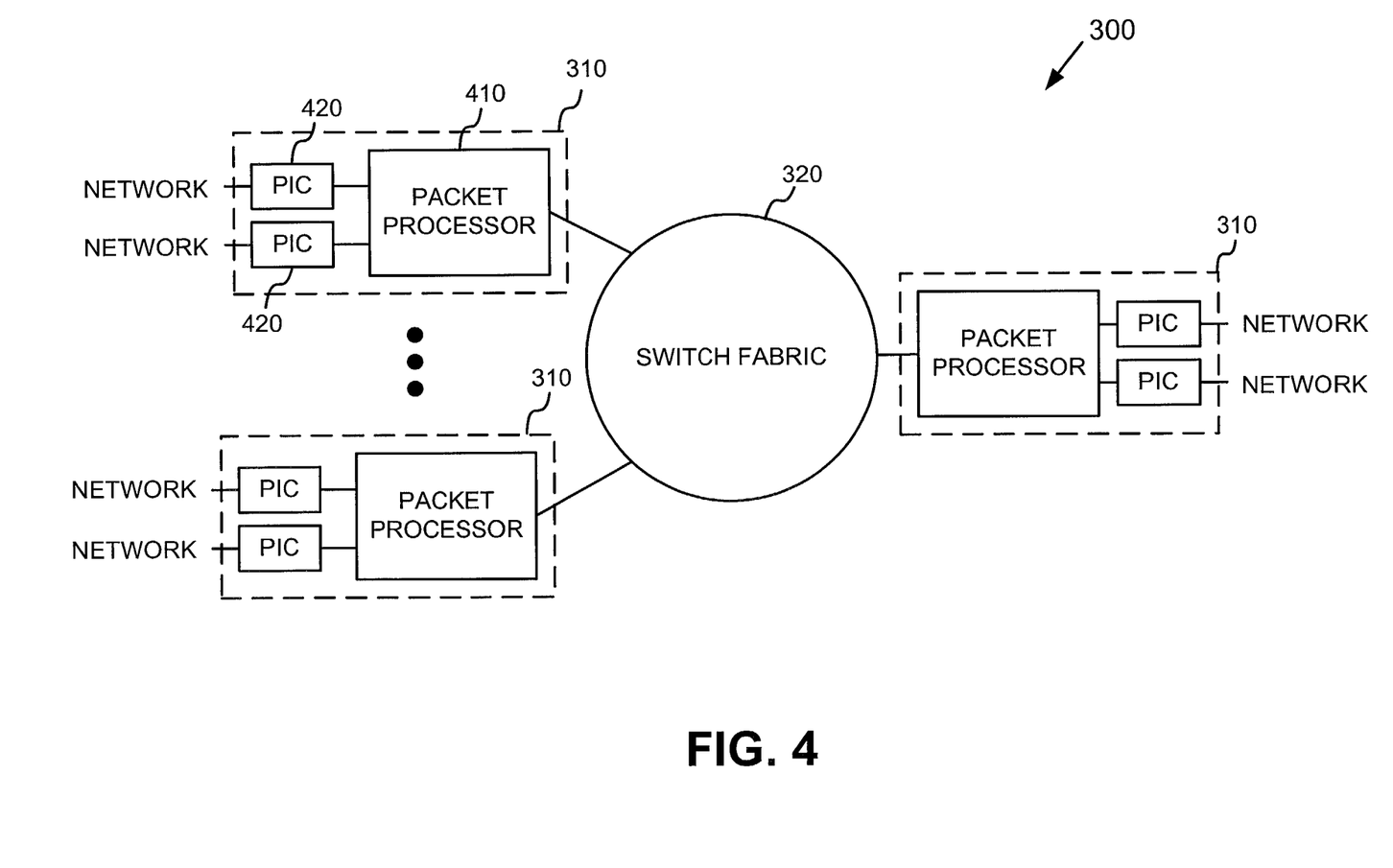
FIG. 4 is a detailed block diagram illustrating portions of the routing system of FIG. 3.

FIG. 4 is a detailed block diagram illustrating portions of routing system 300. PFEs 310 connect to one another through switch fabric 320. Each of PFEs 310 may include one or more packet processors 410 and physical interface cards (PICs) 420. Although FIG. 4 shows two PICs 420 connected to each of packet processors 410 and three packet processors 410 connected to switch fabric 320, in other embodiments consistent with principles of the invention there can be more or fewer PICs 420 and packet processors 410.

Each of packet processors 410 performs routing functions and handle packet transfers to and from PICs 420 and switch fabric 320. For each packet it handles, packet processor 410 performs the previously-discussed route lookup function and may perform other processing-related functions.

PIC 420 may transmit data between a network link and packet processor 410. Different PICs may be designed to handle different types of network links. For example, one of PICs 420 may be an interface for an optical link while another PIC 420 may be an interface for an Ethernet link.

Figure 5:
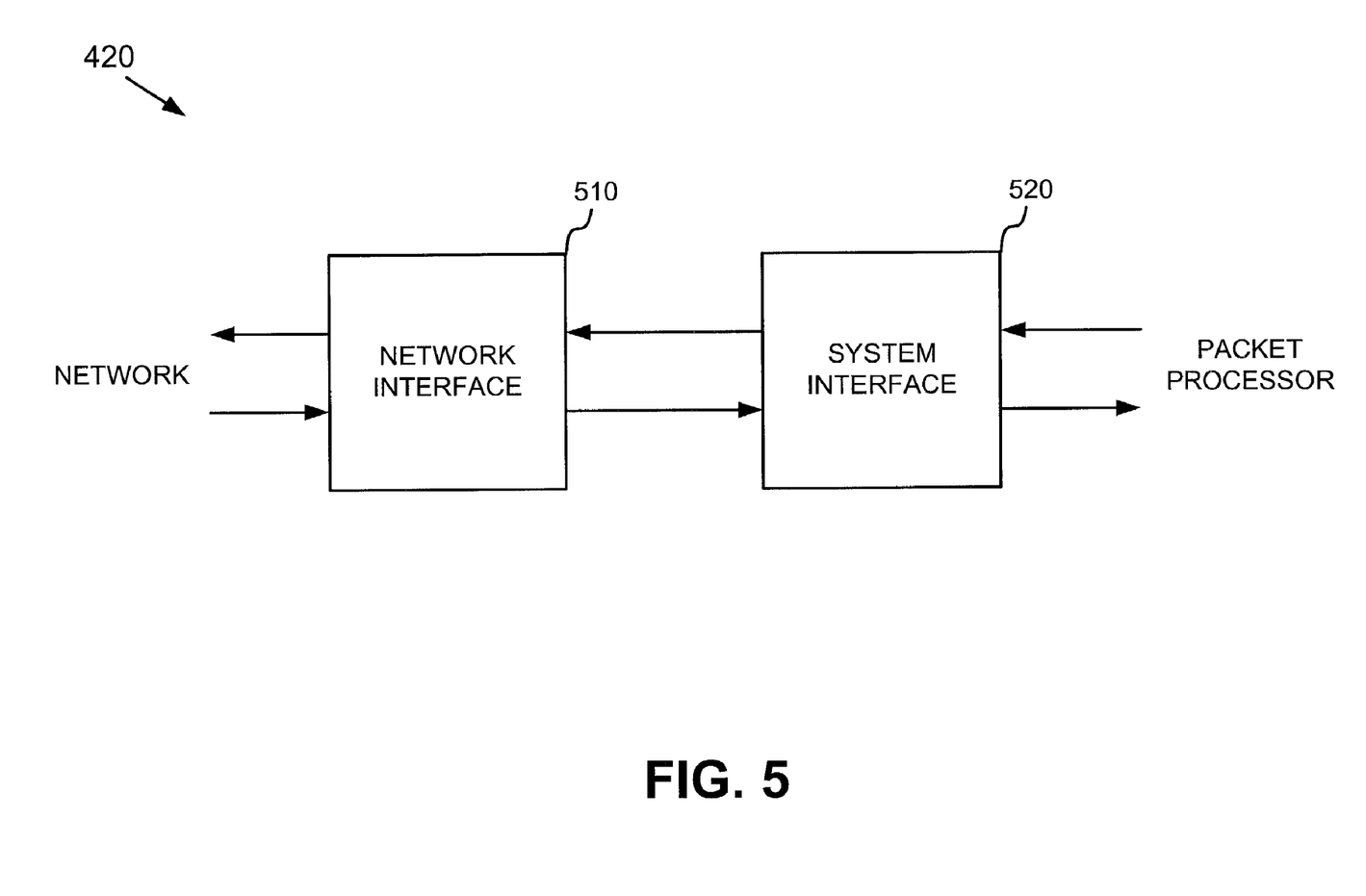
FIG. 5 is an exemplary diagram of a physical interface card of FIG. 4 according to an implementation consistent with the principles of the invention.

FIG. 5 is an exemplary diagram of a PIC 420 consistent with the principles of the invention. PIC 420 may include a network interface 510 and a system interface 520. While FIG. 5 shows network interface 510 and system interface 520 located entirely within PIC 420, in other implementations consistent with the principles of the invention system interface 520 and/or network interface 510 may be located within packet processor 410.

Network interface 510 may connect to the network link and system interface 520 may connect to packet processor 410. Network interface 510 may contain logic to receive and process multiple streams of packets for transmission to system interface 520 or the network link. For example, network interface may add L1 or L2 header information to a packet prior to transmission on the network link.

System interface 520 may include logic to receive and process multiple streams of packets for transmission to network interface 510 or packet processor 410. For example, system interface 520 may separate a packet into data units used by packet processor 410.

Figure 6:
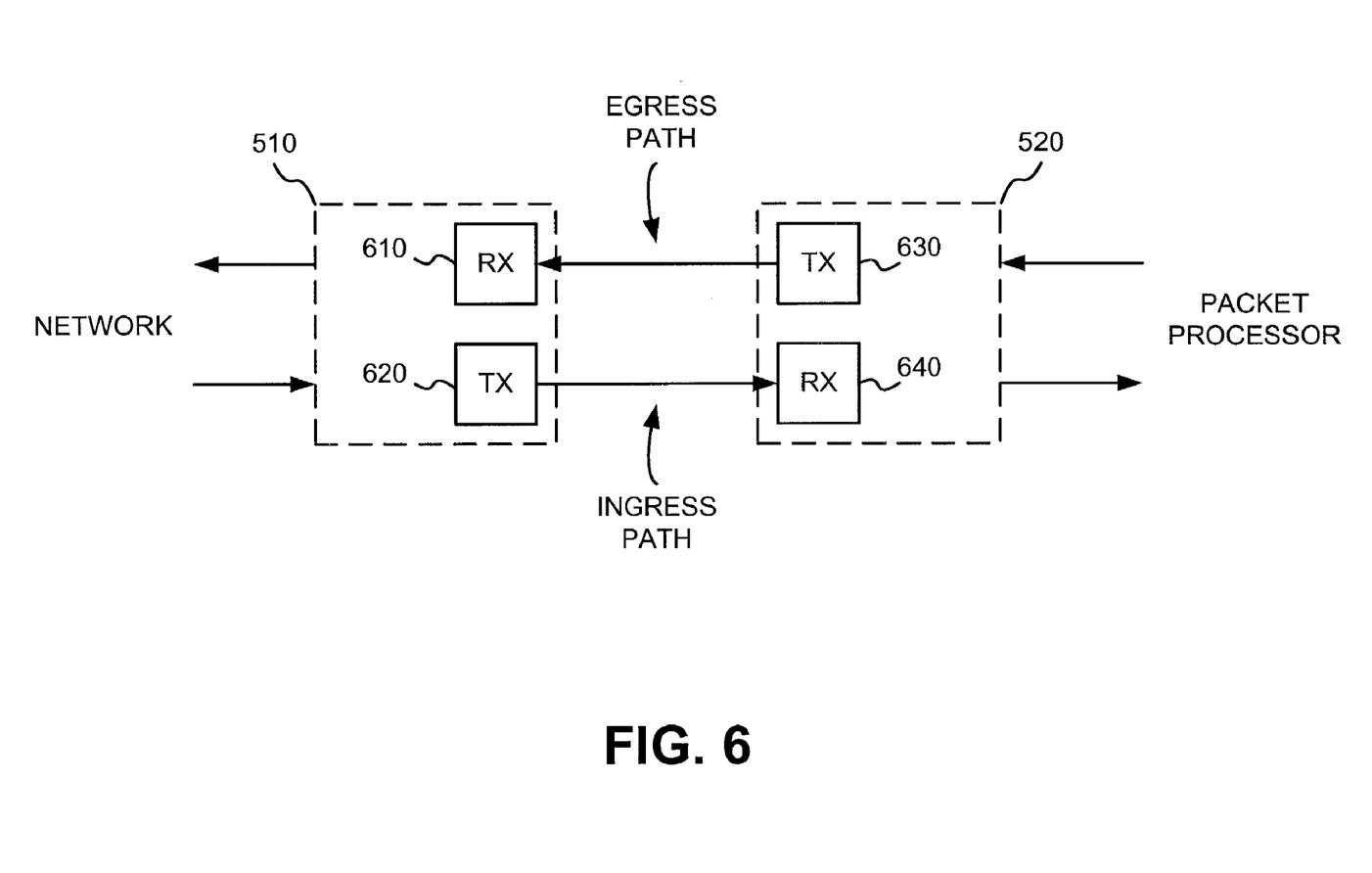
FIG. 6 is an exemplary detailed diagram of portions of the network interface and the system interface of FIG. 5 in an implementation consistent with the principles of the invention.

FIG. 6 is an exemplary detailed diagram of portions of network interface 510 and system interface 520 in an implementation consistent with the principles of the invention. Network interface 510 may include receiver (RX) 610 and transmitter (TX) 620. System interface 520 may include transmitter (TX) 630 and receiver (RX) 640.

Receivers 610 and 640 may include PL4 receivers. Transmitters 620 and 630 may include PL4 transmitters. Transmitter 630 and receiver 610 may be located along an egress path from packet processor 410 to the network link. Transmitter 620 and receiver 640 may be located along an ingress path from the network link to packet processor 410.

As explained above, the ingress path usually includes high bandwidth buses in the system and, therefore, may tolerate underruns (e.g., when one stream has gaps in the middle of the packet). On the egress path, however, underruns and gaps in the middle of a packet are not acceptable because gaps in the middle of the packet cannot be transmitted outside the network device. Transmitter 630 controls the transmission of packets on the egress path.

Figure 7:
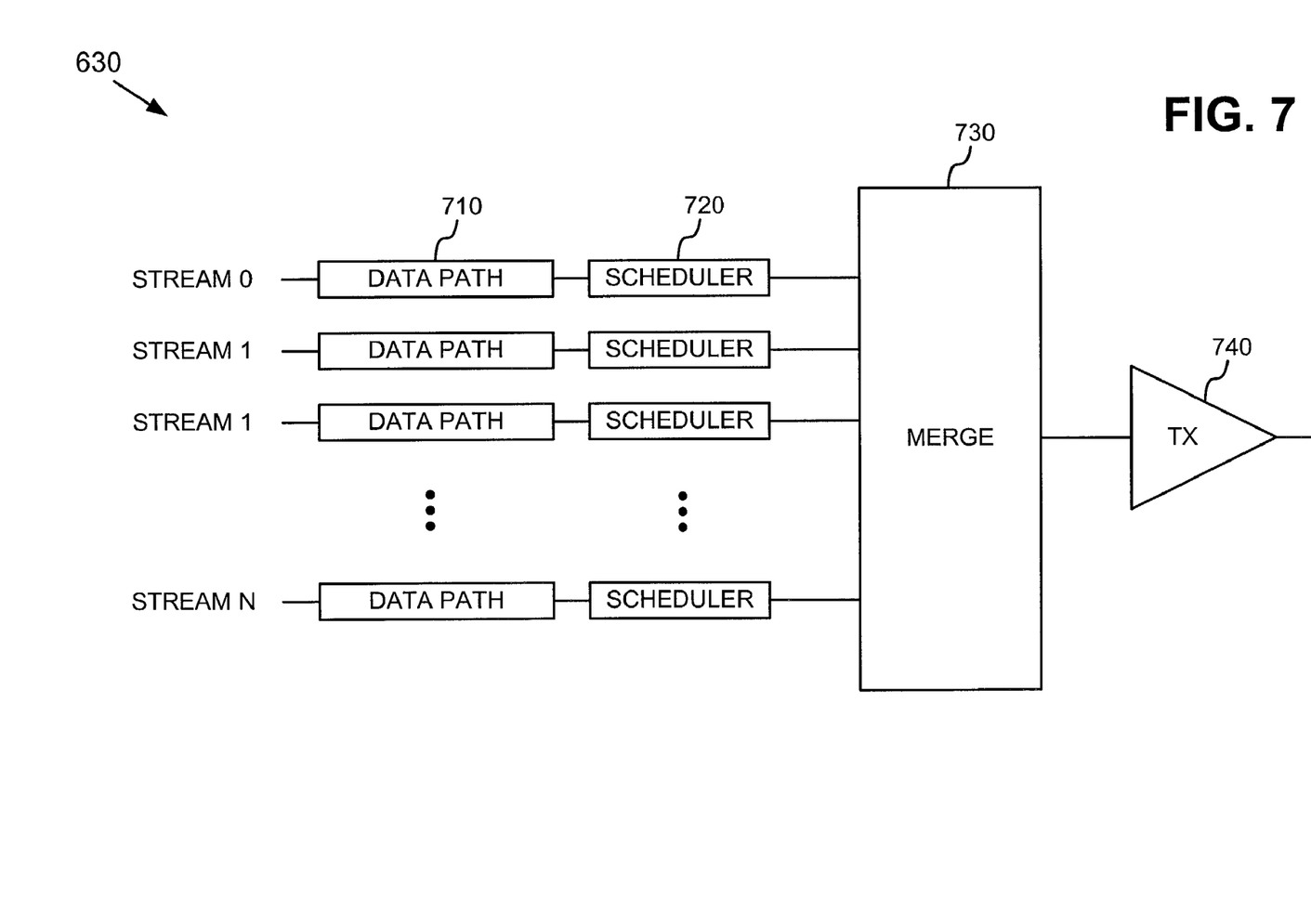
FIG. 7 is an exemplary diagram of the transmitter of FIG. 6 according to an implementation consistent with the principles of the invention.

FIG. 7 is an exemplary diagram of transmitter 630 according to an implementation consistent with the principles of the invention. Transmitter 630 may receive multiple (N) streams of data, where N≧1, and output multiplexed streams.

As shown in FIG. 7, transmitter 630 may include multiple data paths 710 and corresponding schedulers 720, merge logic 730, and transmitter logic 740. In one implementation, each of data paths 710 may include a 128-bit register. In other implementations, data paths 710 may include registers of a different size. Each of data paths 710 may correspond to one of the streams received by transmitter 630 and temporarily buffer packet data received on the corresponding stream.

Figure 8:
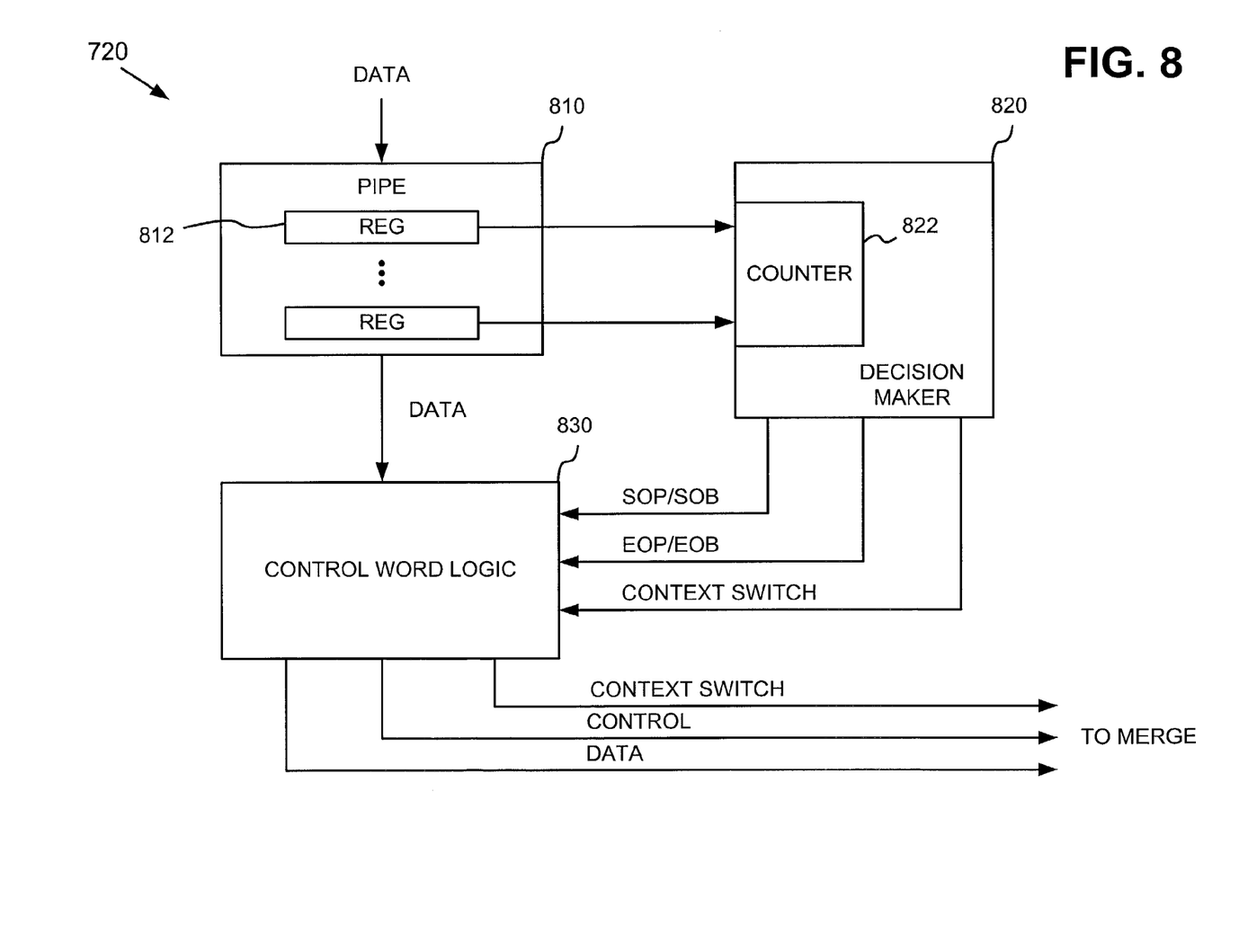
FIG. 8 is an exemplary diagram of the scheduler of FIG. 7 according to an implementation consistent with the principles of the invention.

Scheduler 720 may partition the stream into bursts of data of a particular length (e.g., 64 bytes). FIG. 8 is an exemplary diagram of scheduler 720 according to an implementation consistent with the principles of the invention. Scheduler 720 may include pipe 810, decision maker 820, and control word logic 830. Pipe 810 may include multiple 128-bit registers 812. In one implementation, pipe 810 includes two registers 812 that may be arranged as a first-in, first-out (FIFO) buffer. In other implementations, pipe 810 includes more or fewer registers 812. Additionally, pipe 810 may include registers 812 of a different size (e.g., 32 bits, 64 bits, 512 bits, etc.) in other implementations consistent with the principles of the invention.

Each of registers 812 temporarily buffers data received on the corresponding stream. For example, the first block (e.g., 128 bits) of a packet may be stored in one of registers 812 and any subsequent blocks may be stored in other ones of registers 812.

Decision maker 820 includes logic that schedules stream bursts to balance the bandwidth at the end of a packet (EOP), thereby also avoiding interruption of packet transmission. To accomplish this, decision maker 820 may issue additional bursts when the current burst (at an EOP) is less than the maximum burst size for the stream. In this way, the bandwidth can be balanced so that each of the streams get its fair share.

In one implementation, decision maker 820 may implement a per-stream function, such as the following:

if (current_burst_size<max_burst_size) then
Y=(max_burst size−current burst size)div16
if 16*Y>NPS, then
   add one extra burst to current stream of size: NPS
elseadd one extra burst to current stream of size: 16*Y
else go to next stream and process bursts, where current_burst_size is the size of a current burst on the stream; max_burst_size is the maximum burst size of the stream (which may differ from stream-to-stream); div16 is an integer operation (e.g., divide by 16 and drop the remainder); and NPS is the size of the next packet. If the second burst is also an EOP, the above function can be repeated with the sum of the data from the first and second bursts compared to max_burst_size.

PL4 protocol requires that bursts be sent in multiples of 16 bytes. Because of this, the above function drops the remainder in the "div" operation. There may, nevertheless, arise the case where a stream loses some bandwidth. By making the "div" operation round down, the bandwidth loss occurs at the end of the packet. As a result, full bandwidth is guaranteed in the middle of a packet.

In one implementation consistent with the principles of the invention, decision maker 820 includes one or more counters 822 to facilitate the determination of the number of bytes to include in an additional burst. In this implementation, counter 822 counts the number of clock cycles from the start of a packet (SOP) until the end of the packet (EOP) based on the data output from pipe 810. Decision maker 820 may use the clock cycle count in determining the number of bytes to include in an additional burst.

For each 16 bytes (128 bits) of data in a packet output from a register 812 of pipe 810, counter 822 increments by one until a maximum count and then repeats. In one implementation, the maximum count equals the maximum burst size divided by 16. If the maximum burst size is 64 bytes, then the maximum count is four. Decision maker 820 then may determine the size of the additional burst using a function, such as the following:

((max_burst size/16)−count)*16, where 16 corresponds to the size (in bytes) of register 812 and count corresponds to the count of counter 822 at the end of the packet (EOP).

Suppose, for example, that stream 0 includes packets of 65 bytes and the max_burst_size is 64 bytes. In this case, counter 822 may count the following: 1 (bytes 1–16); 2 (bytes 17–32); 3 (bytes 33–48); 4 (bytes 49–64); and 1 (byte 65/EOP). Decision maker 820 may then determine the number of additional bytes from: ((64/16)−1)*16=48 bytes.

Decision maker 820 outputs data and several control signals to control word logic 830. The control signals may include SOP/SOB, EOP/EOB, and context switch signals. The SOP/SOB signal(s) may indicate whether the data corresponds to a start of a packet (SOP) or a start of a burst (SOB). The EOP/EOB signal(s) may indicate whether the data corresponds to an end of a packet (EOP) or an end of a burst (EOB). The context switch signal may indicate whether to switch to a next packet stream.

Control word logic 830 receives the data and control signals from decision maker 820 and generates a PL4 control word from the SOP/SOB/EOP/EOB signals. In an implementation consistent with the principles of the invention, control word logic 830 may output data (e.g., 128 bits), the PL4 control bits (e.g., 8 bits, one for every two bytes of data), and the context switch signal (e.g., 8 bits).

Returning to FIG. 7, merge logic 730 may include a multiplexer that multiplexes the information received from the schedulers 720 on a bus (e.g., a 128-bit bus) to transmitter logic 740. Merge logic 730 may use the context switch signal from a scheduler 720 in determining when to switch to (or select) the next stream. Transmitter logic 740 may include a conventional transmitter that receives the information from merge logic 730 on a wide bus (e.g., 16 bytes data, 8 bits control) and outputs it to a high speed small bus (e.g., 2 bytes data, 1 bit control) to receiver 610 (FIG. 6).

Exemplary PL4 Transmit Processing

Figure 9:
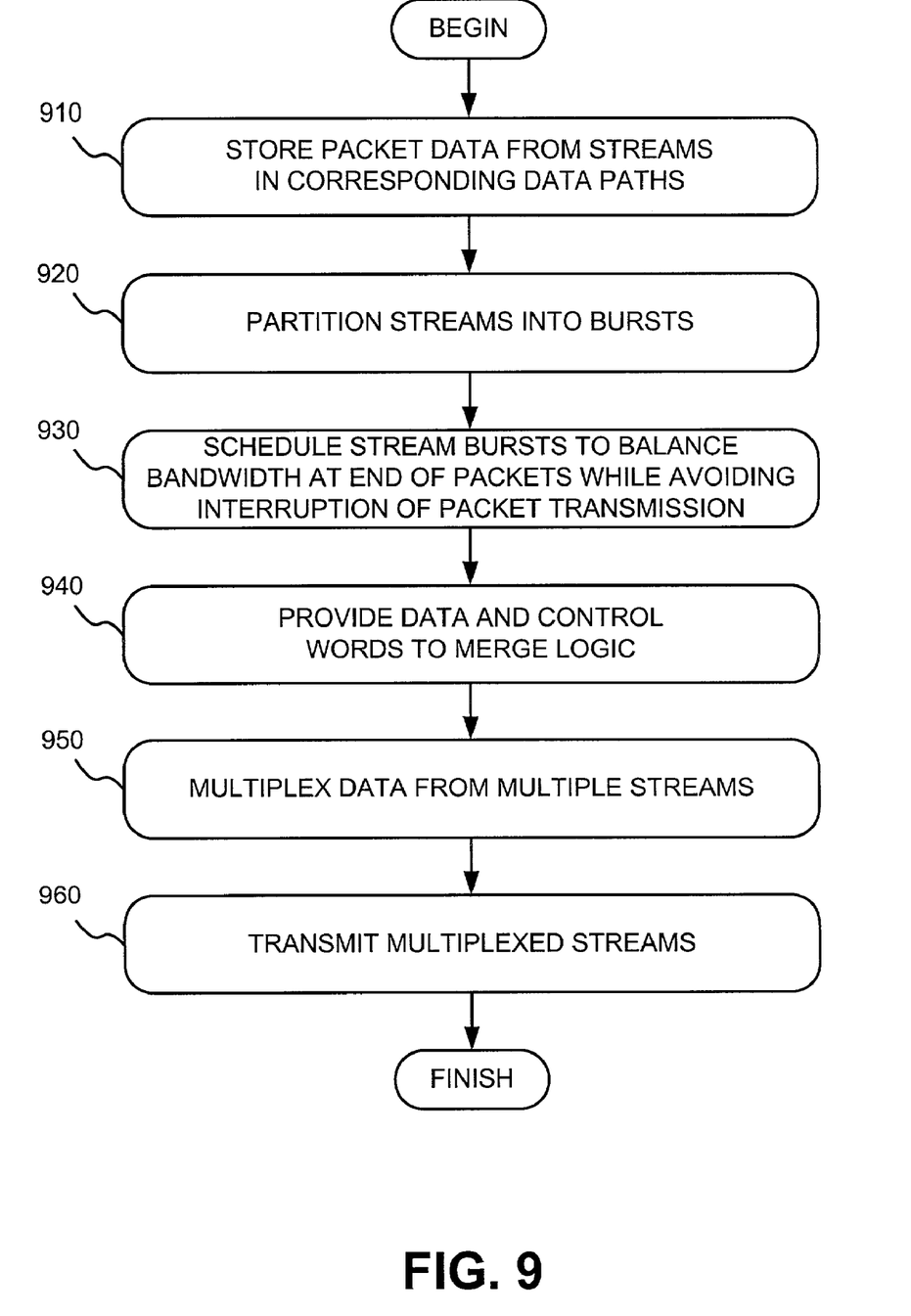
FIG. 9 is a flowchart of exemplary processing by the transmitter of FIG. 6 according to an implementation consistent with the principles of the invention.

FIG. 9 is a flowchart of exemplary processing by transmitter 630 according to an implementation consistent with the principles of the invention. Processing may begin with transmitter 630 receiving streams of packet data. Transmitter 630 may store packet data from each of the streams in the corresponding data paths 710 (act 910). For example, data from stream 0 may be stored in one data path 710, while data from stream N may be stored in a separate data path 710. In one implementation, data path 710 may store 128 bits (i.e., 16 bytes) of the packet data at a time.

Each of schedulers 720 may receive the data from the corresponding data path 710. Scheduler 720 may partition the data into bursts (act 920). For example, scheduler 720 may partition the data into maximum-size bursts (e.g., 64 bytes) for the stream. The maximum burst size may differ from stream-to-stream, but should be a multiple of 16 bytes according to PL4 protocol. If the packet size is not a multiple of the maximum burst size, then a number of bytes of packet data, less than the maximum burst size, may exist at the end of the packet (EOP).

Figure 10:
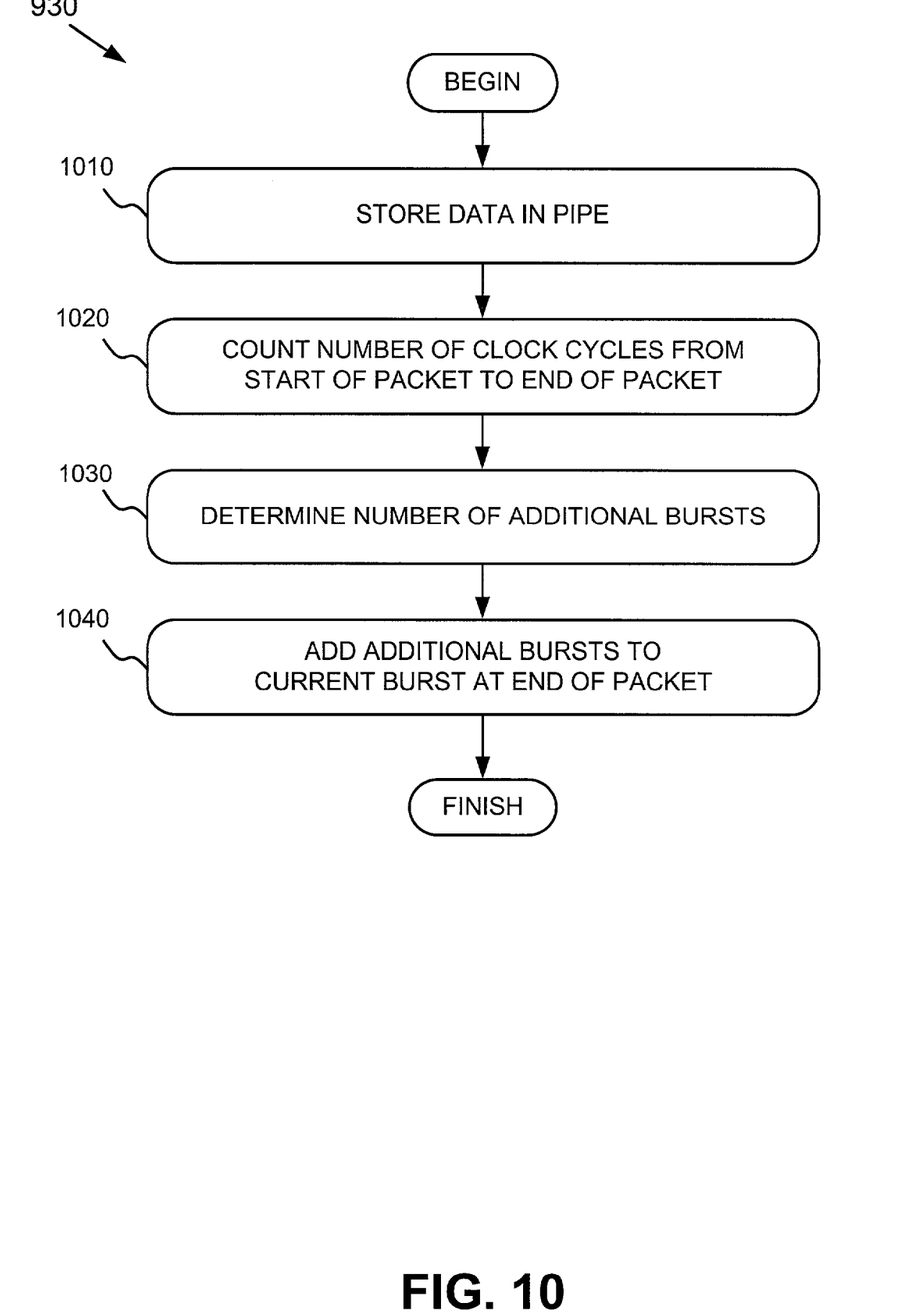
FIG. 10 is a flowchart of exemplary processing by the scheduler of FIG. 8 to balance the bandwidth at the end of a packet according to an implementation consistent with the principles of the invention.

Schedulers 720 may schedule the stream bursts to balance the bandwidth at the end of the packets while avoiding interruption during packet transmission (act 930). FIG. 10 is a flowchart of exemplary processing by scheduler 720 to balance the bandwidth at the end of a packet according to an implementation consistent with the principles of the invention. Processing may begin when scheduler 720 receives a stream of packet data from the corresponding data path 710. Scheduler 720 may store the data in one or more registers 812 within pipe 810. In one implementation, the first 128-bit block (i.e., 16 bytes) of a packet may be stored in one of registers 812 and any subsequent 128-bit blocks may be stored in a separate register 812.

Counter 822 counts the number of clock cycles from the start of the packet (SOP) until the end of the packet (EOP) (act 1020). Counter 822 may reset after max_burst_size/16. If pipe 810 outputs a 128-bit (16-byte) block on each clock cycle, then counter 822 may count the number of 128-bit blocks from the SOP to the EOP. In one implementation, counter 822 increments by one for each 128-bit block it receives until a maximum count of for example, four and then repeats until it reaches a final count value at the EOP.

Decision maker 820 may use the final count value in determining the number of additional bursts to include at the end of the packet (act 1030). For example, decision maker 820 may use a function, such as ((max_burst_size/16)−count)*16, to identify the number of additional bursts to include. Scheduler 720 may then schedule these additional bursts for transmission with the current burst at the end of the packet (act 1040).

Returning to FIG. 9, schedulers 720 may send data, control words, and context switch signals to merge logic 730 (act 940). Merge logic 730 may select one of schedulers 720 from which to receive data. Merge logic 730 may make this selection based, for example, on the context signals received from schedulers 720. Merge logic 730 may multiplex the data from schedulers 720 to create multiplexed packet streams (act 950).

Transmitter logic 740 may receive the multiplexed packet streams from merge logic 730. Transmitter logic 740 may then condition the multiplexed packet streams and transmit them on an output data path (act 960).

EXAMPLES

To illustrate the above processing, assume that stream 0 includes 65-byte packets and streams 1–15 include 64-byte packets. Assume further that the maximum burst size (max_burst_size) for streams 0–15 is 64 bytes. Counter 822 corresponding to stream 0 may increment in the following manner: 1 (bytes 1–16); 2 (bytes 17–32); 3 (bytes 33–48); 4 (bytes 49–64); and 1 (byte 65/EOP). Decision maker 820 may then determine the number of additional bytes from: ((max_burst_size/16)−count)*16. Using the above values, decision maker 820 determines that ((64/16)−1)*16=48 additional bytes should be added at the end of the current packet burst.

Figure 11:
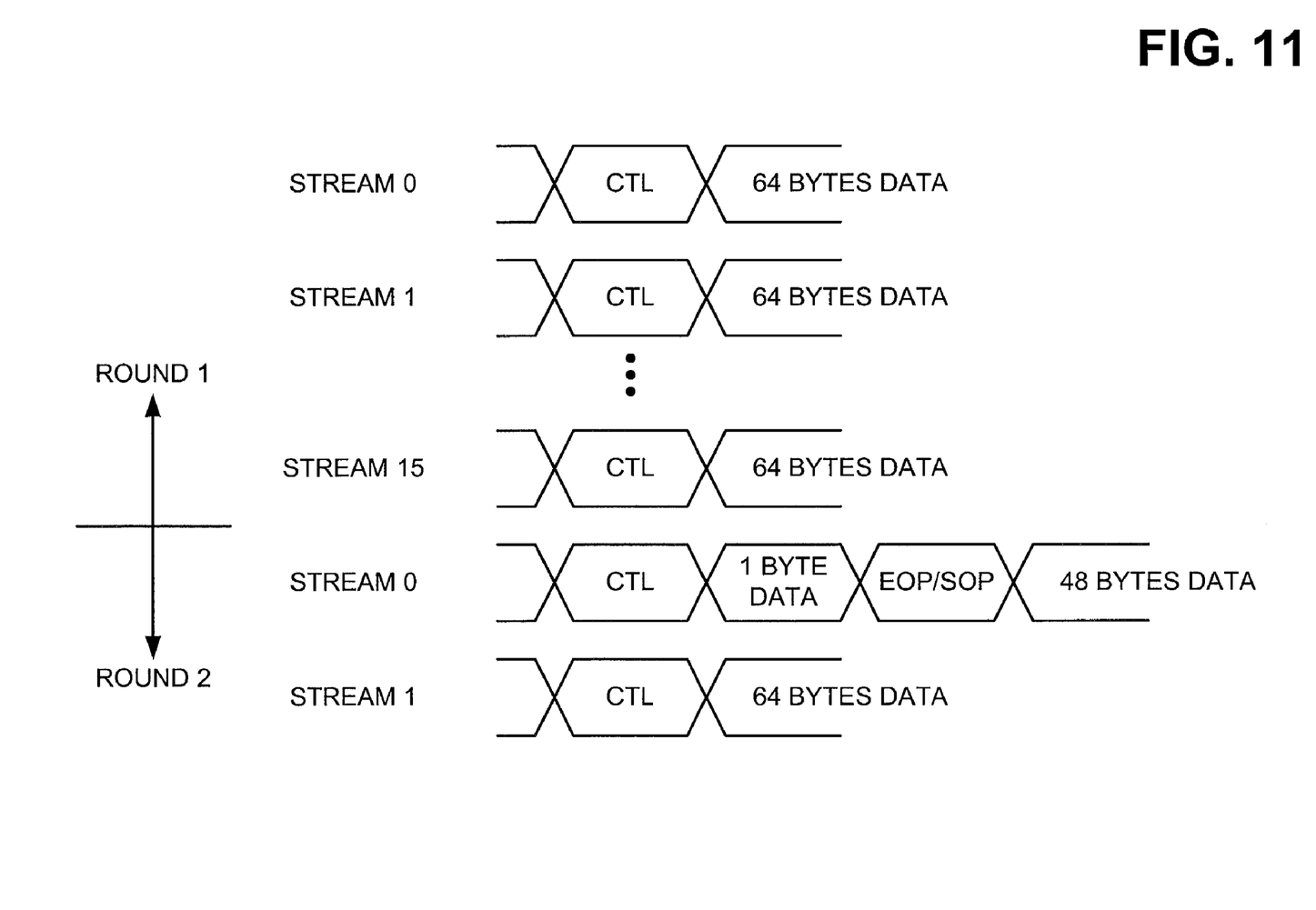
FIG. 11 is a diagram of an exemplary data flow that illustrates an implementation consistent with the principles of the invention.

FIG. 11 is an exemplary data flow that illustrates the above example. During the first round of transmissions, transmitter 630 transmits 64 bytes of packet data for each of streams 0–15. During the next round, stream 0 has one byte left of the 65 bytes of packet data. In this case, transmitter 630 transmits a single byte of packet data for stream 0 followed by an EOP/SOP control signal and 48 bytes of packet data for stream 0. In this case, stream 0 regains its lost bandwidth as compared to the example of FIG. 2. If a small loss of bandwidth occurs, it occurs at an EOP. This guarantees that there is no underrun in the middle of a packet.

Large Maximum Burst Size

In situations where the maximum burst size is chosen as a large number, such as 128 bytes or larger, it may be necessary to alter the above processing to balance the bandwidth output on any given stream.

To compensate for small packet transmissions, the processing performed by decision maker 820 may loop. For example, decision maker 820 may perform a function, such as the following:

```
x=0
while (current_burst_size+x<max_burst_size)
   Y=(max_burst size-(current_burst_size+x))div16
   if 16*Y>NPS, then
      add one extra burst to current stream of size: NPS
   else
      add one extra burst to current stream of size: 16*Y
   x=x+current_burst_size
   else go to next stream and process bursts,
``` where x is a variable initially set to zero and NPS is the size of the next packet.

Figure 12:
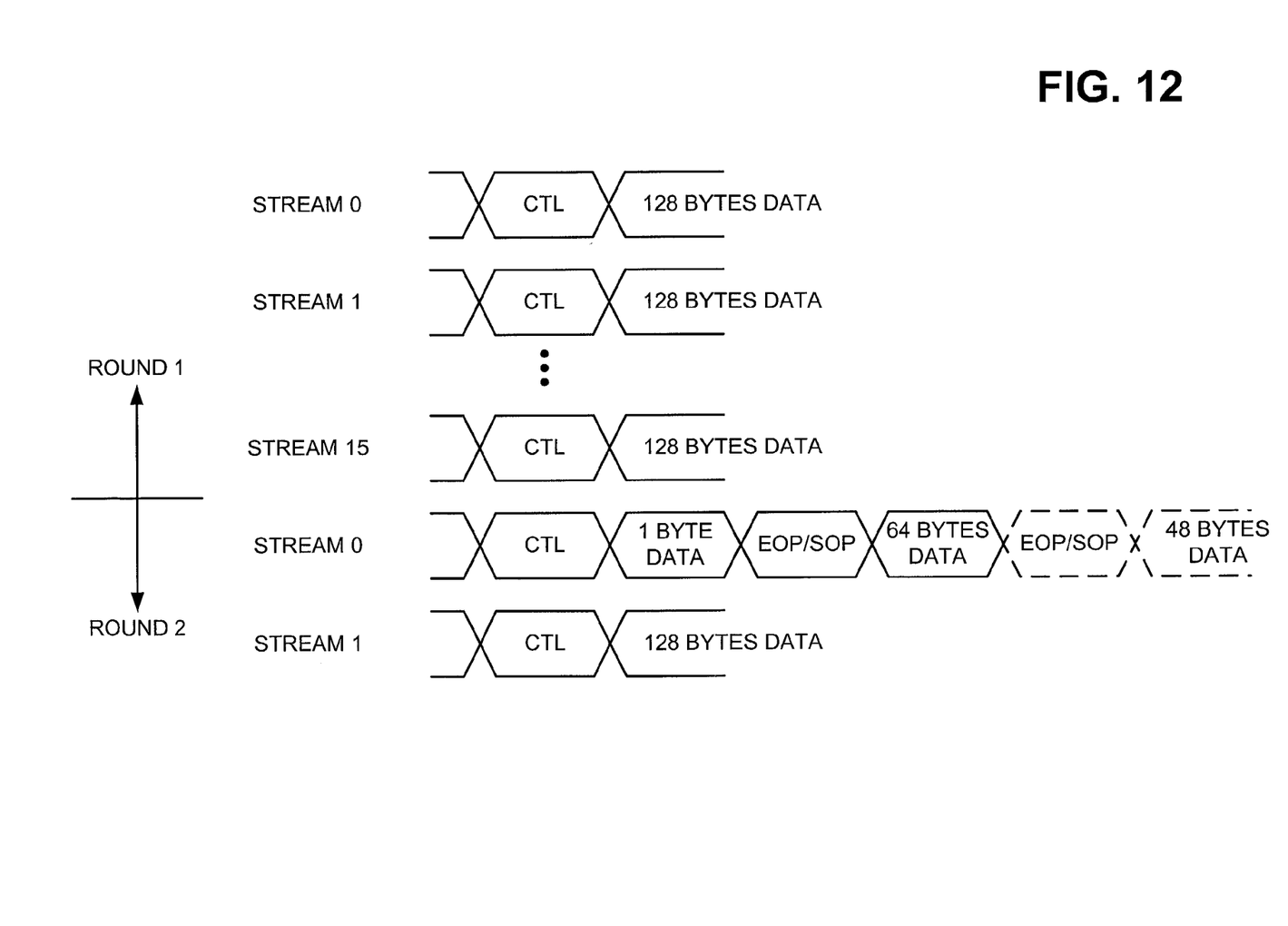
FIG. 12 is a diagram of an exemplary data flow that illustrates an implementation consistent with the principles of the invention when the maximum burst size is large.

FIG. 12 is an exemplary data flow that illustrates benefits of the above processing in the case of a maximum burst size of 128 bytes. Assume that stream 0 includes a 129-byte packet followed by several 64-byte packets. Assume further that streams 1–15 include 128-byte packets.

During the first round of transmissions, transmitter 630 transmits 128 bytes of packet data for each of streams 0–15. During the next round, stream 0 has one byte left of the 129 bytes of packet data. Using the above looping function, decision maker 820 may determine Y from:

$$Y = (\text{max\_burst\_size} - (\text{current\_burst\_size} + x))\text{div}16$$
$$= (128 - (1 + 0))\text{div}16$$
$$= (127)\text{div}16$$
$$= 7.$$

Since 16*Y (i.e., 112) is greater than NPS (i.e., 64—the size of the next packet), decision maker 820 may determine that an extra burst should be added to the current stream of size NPS (64).

During the next loop of the looping function, decision maker 820 may determine Y from:

$$Y = (\text{max\_burst\_size} - (\text{current\_burst\_size} + x))\text{div}16$$
$$= (128 - (64 + 1))\text{div}16$$
$$= (63)\text{div}16$$
$$= 3.$$

Since 16*Y (i.e., 48) is less than NPS (i.e., 64—the size of the next packet), decision maker 820 may determine that an extra burst should be added to the current stream of size 16*Y (48).

As a result, transmitter 630 transmits a single byte of packet data for stream 0 followed by an EOP/SOP control signal, 64 bytes of packet data (the entire next packet), another EOP/SOP control signal, and 48 bytes of packet data (of the next packet) for stream 0. In this case, stream 0 uses approximately 90% of its allocated bandwidth.

To illustrate the benefits of the above looping function, assume that the non-looping function is used. During the first round of transmissions, transmitter 630 transmits 128 bytes of packet data for each of streams 0–15. During the next round, stream 0 has one byte left of the 129 bytes of packet data. Using the non-looping function, decision maker 820 may determine Y from:

$$Y = (\text{max\_burst\_size} - (\text{current\_burst\_size} + x))\text{div}16$$
$$= (128 - (1 + 0))\text{div}16$$
$$= (127)\text{div}16$$
$$= 7.$$

Since 16*Y (i.e., 112) is greater than NPS (i.e., 64—the size of the next packet), decision maker 820 may determine that an extra burst should be added to the current stream of size NPS (64).

As a result, transmitter 630 transmits a single byte of packet data for stream 0 followed by an EOP/SOP control signal and 64 bytes of packet data (the entire next packet) for stream 0. In this case, stream 0 uses much less of its allocated bandwidth (approximately 50%).

CONCLUSION

Systems and methods consistent with the principles of the invention provide a transmit interface that balances the bandwidth used by packet streams without interrupting packet transmission in the middle of a packet. The transmit interface may accomplish this, at least in part, by issuing additional bursts in a stream when the current burst (e.g., at an EOP) in the stream is less than the maximum burst size for the stream.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, although described in the context of a routing system, concepts consistent with the principles of the invention can be implemented in any system, device, or chip that uses variable-sized time slots to communicate with another system, device, or chip.

Also, systems and methods have been described as processing packets. In alternate implementations, systems and methods consistent with the principles of the invention may process other, non-packet, data.

Further, certain portions of the invention have been described as "logic" that performs one or more functions. This logic may include hardware, such as an application specific integrated circuit, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. An interface, comprising:
 a data path configured to:
  receive packet data in a stream, and
  temporarily store the packet data;
 a scheduler configured to:
  partition the packet data into bursts,
  determine whether a size of a current one of the bursts is less than a size of a maximum burst associated with the stream, and
  schedule one or more additional bursts in the stream when the current burst size is less than the maximum burst size; and
 transmitter logic configured to transmit the current burst and the one or more additional bursts.

2. The interface of claim 1, wherein the data path includes a plurality of data paths corresponding to a plurality of streams and the scheduler includes a plurality of schedulers corresponding to the data paths.

3. The interface of claim 2, further comprising:
 merge logic configured to:
  receive bursts from each of the schedulers, and
  multiplex the bursts to create multiplexed streams.

4. The interface of claim 3, wherein the transmitter logic is configured to transmit the multiplexed streams.

5. The interface of claim 1, wherein the scheduler is further configured to determine a size of an additional burst when the current burst size is less than the maximum burst size.

6. The interface of claim 5, wherein when determining a size of an additional burst, the scheduler is configured to:
 determine Y from:
  Y=(maximum burst size−current burst size)div16, and
  if 16*Y>NPS, then
   add one extra burst to the stream of a size equal to NPS,
  else
   add one extra burst to the stream of a size equal to 16*Y
 where NPS is a size of next packet data in the stream.

7. The interface of claim 5, wherein when determining a size of an additional burst, the scheduler is configured to:
 determine Y from:
  Y=(maximum burst size−(current burst size+x))div16,
  if 16*Y>NPS, then
   add one extra burst to the stream of a size equal to NPS,
  else,
   add one extra burst to the stream of a size equal to 16*Y, and
  increment x by x+current burst size,
 where x is a variable initially set to zero and NPS is a size of next packet data in the stream.

8. The interface of claim 1, wherein the scheduler includes:
 a buffer configured to temporarily store the packet data, and
 a decision maker configured to determine whether to schedule the one or more additional bursts.

9. The interface of claim 8, wherein the decision maker includes:
 a counter configured to generate a count value based on a number of clock cycles from a start of a packet to an end of the packet.

10. The interface of claim 9, wherein the decision maker is configured to use the count value to identify a number of additional bursts.

11. The interface of claim 9, wherein the counter is configured to increment to a maximum count value and return to a predetermined value.

12. The interface of claim 9, wherein the scheduler is further configured to determine a size of an additional burst based on the count value when the current burst size is less than the maximum burst size.

13. The interface of claim 12, wherein when determining a size of an additional burst, the scheduler is configured to use a function:
 ((maximum burst size/16)−count value)*16.

14. A system for balancing bandwidth used by a data stream, comprising:
 means for receiving data in the data stream;
 means for partitioning the data into bursts;
 means for determining whether a size of a current one of the bursts is less than a size of a maximum burst associated with the data stream;
 means for scheduling one or more additional bursts in the data stream when the current burst size is less than the maximum burst size; and
 means for transmitting the current burst and the one or more additional bursts.

15. A method for balancing bandwidth used by a packet stream, comprising:
 receiving packet data in the packet stream;
 partitioning the packet data into bursts;
 identifying whether a size of a current one of the bursts is less than a size of a maximum burst associated with the packet stream;
 scheduling an additional burst in the packet stream when the current burst size is less than the maximum burst size; and
 transmitting the current burst and the additional burst to balance bandwidth used by the packet stream.

16. The method of claim 15, wherein the packet stream includes a plurality of packet streams and the method is performed on a per-packet stream basis.

17. The method of claim 16, further comprising:
 multiplexing bursts from different ones of the packet streams to create multiplexed packet streams.

18. The method of claim 15, further comprising:
 determining a size of the additional burst to schedule when the current burst size is less than the maximum burst size.

19. The method of claim 18, wherein the determining a size of the additional burst includes:
 determining Y from:
  Y=(maximum burst size−current burst size)div16, and
  if 16*Y>NPS, then
   adding one extra burst to the packet stream of a size equal to NPS,
  else
   adding one extra burst to the packet stream of size equal to 16*Y,
 where NPS is a size of next packet data in the packet stream.

20. The method of claim 18, wherein the determining a size of the additional burst includes:
 determining Y from:
  Y=(maximum burst size−(current burst size+x))div16,
  if 16*Y>NPS, then
   adding one extra burst to the packet stream of a size equal to NPS,
  else,
   adding one extra burst to the packet stream of a size equal to 16*Y and
  incrementing x by x+current burst size,
 where x is a variable initially set to zero and NPS is a size of next packet data in the packet stream.

21. The method of claim 15, wherein the scheduling an additional burst includes:
generating a count value based on a number of clock cycles from a start of packet data to an end of the packet data.

22. The method of claim 21, wherein the count value is generated using a counter that increments to a maximum count value and returns to a predetermined value.

23. The method of claim 21, wherein the scheduling an additional burst further includes:
determining a size of the additional burst to schedule based on the count value.

24. The method of claim 23, wherein the determining a size of the additional burst includes:
using a function:
((maximum burst size/16)−count value)*16
to identify the size of the additional burst.

25. A network device, comprising:
a switch fabric; and
a plurality of forwarding engines coupled to the switch fabric, each of the forwarding engines being configured to:
receive data in a plurality of data streams,
partition the data into bursts,
determine whether a size of a current one of the bursts associated with one of the data streams is less than a size of a maximum burst associated with the one data stream,
schedule an additional burst in the one data stream when the current burst size is less than the maximum burst size, and
transmit the current burst and the additional burst in the one data stream.

26. The network device of claim 25, wherein each of the forwarding engines is further configured to:
multiplex bursts from each of the data streams to create multiplexed data streams.

27. The network device of claim 25, wherein each of the forwarding engines is further configured to determine a size of the additional burst to schedule when the current burst size is less than the maximum burst size by:
determining Y from:
Y=(maximum burst size−current burst size)div16, and
if 16*Y>NPS, then
adding one extra burst to the one data stream of a size equal to NPS,
else
adding one extra burst to the one data stream of a size equal to 16*Y
where NPS is a size of next data in the one data stream.

28. The network device of claim 25, wherein each of the forwarding engines is further configured to determine a size of the additional burst to schedule when the current burst size is less than the maximum burst size by:
determining Y from:
Y=(maximum burst size−(current burst size+x))div16,
if 16*Y>NPS, then
adding one extra burst to the one data stream of a size equal to NPS,
else,
adding one extra burst to the one data stream of a size equal to 16*Y, and
incrementing x by x+current burst size,
where x is a variable initially set to zero and NPS is a size of next data in the one data stream.

29. The network device of claim 25, wherein each of the forwarding engines is further configured to:
generate a count value based on a number of clock cycles from a start of data to an end of the data.

30. The network device of claim 29, wherein each of the forwarding engines is further configured to:
determine a size of the additional burst to schedule when the current burst size is less than the maximum burst size using:
((maximum burst size/16)−count value)*16.

31. A method for balancing bandwidth used by a data stream, comprising:
receiving data in the data stream;
partitioning the data into bursts;
identifying whether a size of a current one of the bursts is less than a size of a maximum burst associated with the data stream;
scheduling an additional burst in the data stream when the current burst size is less than the maximum burst size; and
transmitting the current burst and the additional burst to balance bandwidth used by the data stream.

* * * * *